April 19, 1932.  E. D. TILLYER  1,854,724
EYE TESTING INSTRUMENT
Filed Feb. 1, 1930
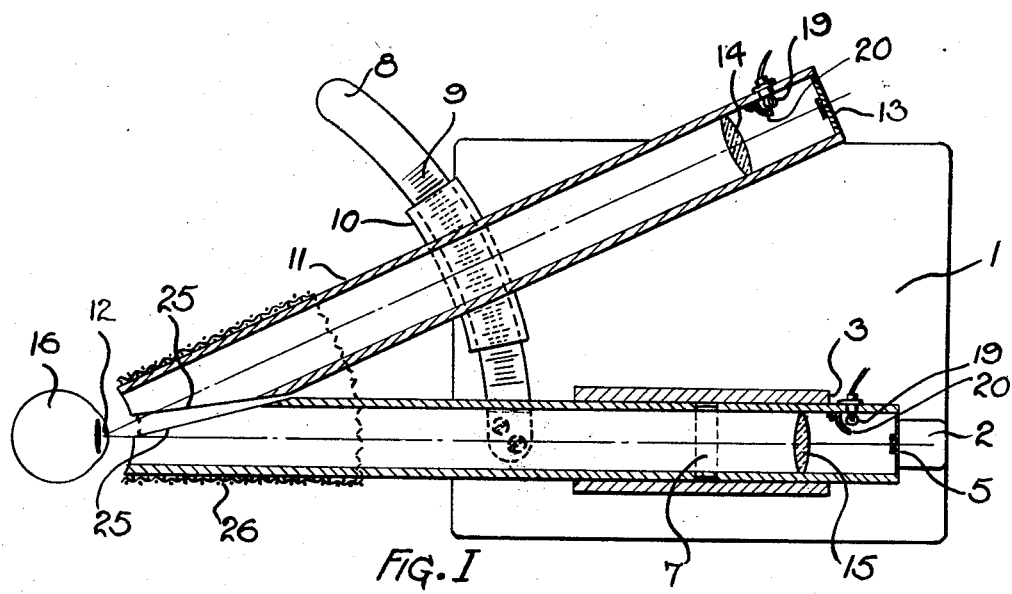
Fig. I
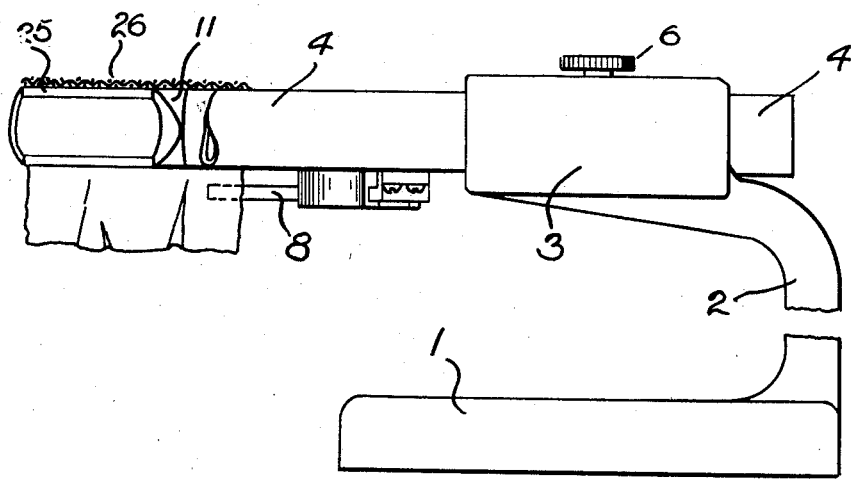
Fig. II
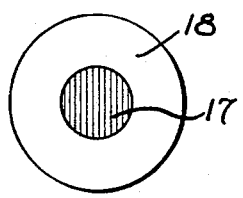
Fig. III
EDGAR D. TILLYER
INVENTOR
BY Harry H. Styll
ATTORNEY Patented Apr. 19, 1932

1,854,724

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

EYE TESTING INSTRUMENT

Application filed February 1, 1930. Serial No. 425,238.

This invention relates to improvements in eye-testing instruments and has particular reference to instruments for testing and measuring the field of vision.

The principal object of this invention is to provide a simple, inexpensive and complete device whereby the field of vision of each eye may be ascertained.

Another object of this invention is to provide efficient and simple means to prevent attention being distracted by extraneous objects.

Another object of this invention is to provide means for testing both the visual and color fields of the eye.

Another object of this invention is to provide means to promote clear vision of the test and fixation objects.

Another object of this invention is to provide means for the simultaneous measuring and recording of the field of vision.

Other objects and advantages will become apparent from the following description taken in connection with the accompanying drawings and it will be understood that many changes may be made in the details of construction, and arrangement of parts without departing from the spirit of the invention as expressed in the accompanying claims. I, therefore, do not wish to be limited to the exact details shown and described as the preferred forms only have been shown by way of illustration.

In the drawings:

Fig. I is a top or plan view, partly in section, showing my improved instrument.

Fig. II is a front view of the same.

Fig. III is a front view of the color test object.

The usual type of apparatus for measuring the field of vision is of an elaborate nature when made upon scientific principles and is also a bulky and expensive addition to the practitioners stock. The movable target, for instance, is attached to a huge arcuate arm which is supported on a framework large enough to enable it to be swung in any meridian and altogether the instrument is not economical, neat nor easy to use.

In this invention all the expensive mechanism has been eliminated and, although the accuracy of the tests has not been impaired in any way, a much simpler and more compact instrument has been devised which will enable every practitioner to conduct perimetry tests without the necessity of purchasing an expensive and unnecessarily elaborate instrument.

Referring to the drawings wherein similar characters of reference denote corresponding parts throughout the numeral 1 denotes the base of my improved instrument having an upwardly extending arm 2 thereon which terminates in a bearing portion 3.

Rotatably mounted in the bearing 3 is a tubular member 4 having an open end and a fixation spot 5 at the other. The interior of the tubular member 4 may have a neutral color such as gray in order that attention will not be attracted to anything but the fixation spot 5 which may be of any suitable size. To hold the tube 4 in position a screw 6 is provided in the bearing 3 and locates in a groove 7 in the tube 4. The screw 6 may be loosened to allow rotation of the tube 4 as desired but the groove 7 will prevent undesired longitudinal movement.

On one side of the tube is secured an arcuate arm 8 having a graduated scale 9 on both sides. A saddle member 10 shaped to slide freely on the arm 8 carries a second tubular member 11 also having a neutral color interior and so arranged that a continuation of its axis will intersect a continuation of the axis of the first tube 4 at the point 12 Fig. I. It will be seen that the arcuate arm 8 is an arc having its center upon the point 12 to allow the tube 11 to be pivoted thereupon.

In order to allow the tubular members to be pivoted at the point 12 of the eye I cut away a portion 25 on each tube and thereby allow free pivotal movement of the second tube 11 to the extent of the visual field. I also place a preferably dark-colored cloth 26 over the portions 25 to prevent undesired light from entering the tubes at this point. It will readily be seen that the patient's eye will be occluded from exterior objects and will therefore see only the objects in the tubes which concentration is highly desirable in perimetry tests.

A suitable sized target 13 is placed at one end of the second tube 11 while the other end is open as in the first tube 4. A lens 14 is held in the tube 11 adjacent the target 13 to project said target to infinity or other point clearly seen and a similar lens 15 is held in the tube 4. A lamp 19 having a shade 20 thereover may be used in each tube to illuminate the test spots.

It will now be apparent that an extremely simple apparatus has been devised to measure and record the visual field of the eye inasmuch as no elaborate mechanism is necessary to accomplish the desired results as will be apparent from the following description of the operation.

In the operation of the device the tubes 4 and 11 are closed together until the eye 16 can sight both the fixation object 5 and target 13. The eye 16 will then be in the position shown in Fig. I. The first tube 4 is, of course, locked in position with the axis of the two tubes either in the same horizontal plane or at any desired angle to each other.

The second tube 11 is next moved on the arcuate arm 8 away from the first tube 4 until the limit of the visual field is reached. The angle of this will be recorded automatically on the scale 9 and the screw 6 may then be loosened to enable the second tube 11 to be swung at an angle to the horizontal plane of the first. The second tube 11 is then used to record the extent of the entire field by moving it towards and away from the first tube in the plane of the tubes and it may be also completely rotated in a plane normal to the plane of the two tubes by the rotation of the tube 4 in the bearing 3. The scale 9 on each side of the arcuate arm will enable measurements to be taken notwithstanding whether the second tube 11 is being used on the right or left hand side of the first tube 4.

Any serious encroachment on the field of vision at any point will become immediately apparent upon the rotation of the second tube 11 around the first tube 4 and the amount will be indicated automatically on the scale 9. This forms a simple test for the visual field and if desired I can also map out the color field of the eye.

To accomplish this additional test I provide in the tube 11 a colored spot 17, say of red, on a grey back field 18, Fig. III, in place of the target 13. The red spot is of a chosen color and brighter than the grey back field 18 when at the center of the color field of a normal eye, but when placed at the margin of said field will appear as of the same visual intensity. In this way I have provided means whereby the colored spot will blend or fade into its surrounding field 18 when moved to the margin of the color field of the eye under test.

It will be understood that the test spot 17 may be of any desired color, such as red, green, yellow or blue, depending on the different fields being tested and may be of any size desired.

In the operation of the color field test the second tube 11 is moved towards and away from the first tube 4 or completely around in a plane normal thereto as described above as in testing the visual field. If the red color field is being tested the red spot is used and the patient fixes his eye on the fixation splot 5 in the first tube 4 and the color splot 17 will disappear and emerge at certain boundaries and these are recorded on the scale 9. A different colored test object is used for the different color fields as has been related.

From the foregoing it will be apparent that I have provided a useful and desirable instrument for measuring the various fields of the eye. The simplicity of construction and operation will be seen from the description and while the elaborate mechanism of prior art instruments has been eliminated it will be clear that the accuracy and completeness of the tests has not been jeopardized. The instrument is economical to manufacture and compact in size and the ease and speed of operation will be readily apparent.

Having described my invention, I claim:

1. Means for mapping the visual field of an eye under test comprising a support, a member rotatably mounted on the support and having a fixation object thereon positioned at the center or rotation of said support and in line with straight ahead vision of the eye under test, a test object support on the rotatable member and having a test object thereon movable towards and away from the fixation object and to different meridians relative to the fixation object and means for locking the rotatable member in desired selected meridians relative to the fixation object to prevent movement of said rotatable member during the movement of the test object towards and away from said fixation object in said selected meridians.

2. Means for mapping the color fields of an eye under test comprising a support, a member rotatably mounted on the support and having a fixation object thereon positioned at the center of rotation of said support and in line with straight ahead vision of the eye under test, a test object support on the rotatable member having a colored test object thereon of the color to be tested, said test object being movable towards and away from the fixation object and to different meridians relative to the fixation object and means for locking the rotatable member in desired selected meridians relative to the fixation object to prevent movement of said rotatable member during the movement of the colored test object towards and away from said fixation object in said selected meridians.

3. Means for mapping the visual field of an eye under test comprising a support, a tubular member rotatably mounted on the support and having its longitudinal axis lying on the line of straight ahead vision of the eye under test, a fixation object in the tubular member positioned at the center of rotation of said tubular member and on said line of straight ahead vision, a second tubular member on the first and having a test object therein movable in an arc towards and away from the fixation object about the eye as the center of said arcuate movement and to different meridians relative to said fixation object about said fixation object as the center of movement.

4. Means for mapping the color fields of an eye under test comprising a support, a tubular member rotatably mounted on the support and having its longitudinal axis lying on the line of straight ahead vision of the eye under test, a fixation object in the tubular member positioned at the center of rotation of said tubular member and on said line of straight ahead vision, a second tubular member on the first and having a colored test object therein of the color to be tested, said test object being movable in an arc towards and away from the fixation object about the eye as the center of said arcuate movement and to different meridians relative to said fixation object about said fixation object as a center of movement.

5. Means for mapping the visual field of an eye under test comprising a support, a tubular member rotatably mounted on the support and having its longitudinal axis lying on the line of straight ahead vision of the eye under test, a fixation object in the tubular member positioned at the center of rotation of said tube and on said line of straight ahead vision, a second tubular member on the first having a test object therein movable in an arc towards and away from the fixation object about the eye as the center of said arcuate movement and to different meridians relative to said fixation object and indicator means cooperating with said tubular members for measuring and recording the limits of said field.

6. Means for mapping the color fields of an eye under test comprising a support, a tubular member rotatably mounted on the support and having its longitudinal axis lying on the line of straight ahead vision of the eye under test, a fixation object in the tubular member positioned at the center of rotation of said tubular member and on said line of straight ahead vision, a second tubular member on the first and having a colored test object therein of the color to be tested, said test object being movable in an arc towards and away from the fixation object about the eye as the center of said arcuate movement and to different meridians relative to said fixation object about said fixation object as the center of movement, said tubular members having their inner walls of a gray or neutral color.

7. Means for mapping the color fields of an eye under test comprising a support, a tubular member rotatably mounted on a support and having its longitudinal axis lying on the line of straight ahead vision of the eye under test, a fixation object in the tubular member positioned at the center of rotation of said tube and on said line of straight ahead vision, a second tubular member on the first and having a test object therein movable in an arc towards and away from the fixation object about the eye as the center of said arcuate movement and to different meridians relative to said fixation object about said fixation object at the center of movement, said test object having a field of one color and a spot of a different color thereon, said spot having a color brighter in visual intensity than the surrounding field when located substantially at the center of the color field of the eye under test and appearing as being of the same visual intensity and blending with the color of the field when positioned adjacent the edge of the color field being tested.

8. Means for mapping the visual field of an eye under test comprising a support, a tubular member rotatably mounted on the support and having its longitudinal axis lying on the line of straight ahead vision of the eye under test, a fixation object in the tubular member positioned at the center of rotation of said tube and on said line of straight ahead vision, a second tubular member on the first and having a test object therein movable in an arc towards and away from the fixation object about the eye as the center of said arcuate movement and to different meridians relative to said fixation object and an expandible cover on the tubular members adjacent the eye under test for shielding the eye from undesired extraneous objects during the movement of said tubular members.

EDGAR D. TILLYER.